(12) United States Patent
Cordeiro et al.

(10) Patent No.: US 9,137,704 B2
(45) Date of Patent: *Sep. 15, 2015

(54) MULTI-RECEIVER FRAME AGGREGATION

(71) Applicant: Intel Corporation, Santa Clara, CA (US)

(72) Inventors: Carlos Cordeiro, Portland, OR (US); Minyoung Park, Portland, OR (US)

(73) Assignee: INtel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,500

(22) Filed: Jan. 10, 2014

(65) Prior Publication Data

US 2014/0126478 A1 May 8, 2014

Related U.S. Application Data

(63) Continuation of application No. 12/053,722, filed on Mar. 24, 2008, now Pat. No. 8,660,144.

(60) Provisional application No. 61/035,480, filed on Mar. 11, 2008.

(51) Int. Cl.
*H04W 4/00* (2009.01)
*H04W 28/06* (2009.01)
*H01Q 3/26* (2006.01)
*H04B 7/06* (2006.01)

(52) U.S. Cl.
CPC .............. *H04W 28/06* (2013.01); *H01Q 3/26* (2013.01); *H04B 7/0682* (2013.01)

(58) Field of Classification Search
None
See application file for complete search history.

(56) References Cited

U.S. PATENT DOCUMENTS

| 7,433,329 | B2 | 10/2008 | Qian |
| 7,688,855 | B2 | 3/2010 | Qian |
| 8,660,144 | B2 | 2/2014 | Cordeiro et al. |
| 2006/0018268 | A1* | 1/2006 | Kakani et al. ............... 370/278 |

(Continued)

FOREIGN PATENT DOCUMENTS

| CN | 1849772 A | 10/2006 |
| CN | 1951070 A | 4/2007 |

(Continued)

OTHER PUBLICATIONS

Extended European search Report received for European Patent Application No. 09720301.2, mailed on Apr. 4, 2014, 7 pages.

(Continued)

*Primary Examiner* — Robert C Scheibel
(74) *Attorney, Agent, or Firm* — Sutherland Asbill & Brennan LLP

(57) ABSTRACT

When using a multi-receiver aggregation protocol in a wireless communications network, a sub-header may be used to identify groups of data units that share common parameters, such as destination addresses, acknowledgement modes, modulation/coding rates, lengths, etc. The layout of this sub-header may permit each receiving device to identify the portion of the aggregated payload that is addressed to that receiving device, where that portion is located, how long that portion is, and how to demodulate it. In addition, by controlling the selection and timing of various acknowledgement modes used by the mobile stations, a base station may improve overall network efficiency and throughput.

18 Claims, 7 Drawing Sheets

Aggregation Model

Legend:
- SDU: Service Data Unit
- MSDU: MAC Service Data Unit
- MPDU: MAC Protocol Data Unit
- PSDU: PHY Service Data Unit
- PPDU: PHY Protocol Data Unit

(56) References Cited

U.S. PATENT DOCUMENTS

| | | | |
|---|---|---|---|
| 2006/0056362 A1* | 3/2006 | Jang et al. | 370/336 |
| 2006/0056443 A1 | 3/2006 | Tao et al. | |
| 2006/0072530 A1 | 4/2006 | Strutt et al. | |
| 2006/0087996 A1 | 4/2006 | Stephens | |
| 2007/0053354 A1 | 3/2007 | Rudolf et al. | |
| 2008/0049654 A1 | 2/2008 | Otal et al. | |
| 2009/0147734 A1 | 6/2009 | Naka et al. | |
| 2010/0097967 A1* | 4/2010 | Kwon et al. | 370/310 |
| 2010/0202472 A1 | 8/2010 | Qian | |

FOREIGN PATENT DOCUMENTS

| | | |
|---|---|---|
| CN | 101036348 A | 9/2007 |
| EP | 1635496 A2 | 3/2006 |
| JP | 2005-318487 A | 11/2005 |
| JP | 2007-523504 A | 8/2007 |
| JP | 2007-537655 A | 12/2007 |
| JP | 2008-512927 A | 4/2008 |
| JP | 2011-517869 A | 6/2011 |
| WO | 2005/015812 A1 | 2/2005 |
| WO | 2005/076536 A1 | 8/2005 |
| WO | 2005/112355 A1 | 11/2005 |
| WO | 2006/120650 A1 | 11/2006 |
| WO | 2007/112227 A1 | 10/2007 |
| WO | 2009/114484 A1 | 9/2009 |

OTHER PUBLICATIONS

Office Action received for Chinese Patent Application No. 200980107846.2, mailed on Apr. 30, 2014, 6 pages of English Translation and 3 pages of Office Action.

Notice of Allowance received for Japanese Patent Application No. 2010-547874, mailed on Sep. 18, 2012, 3 Pages of Notice of Allowance only.

Notice of Allowance received for Korean Patent Application No. 2010-7020350, mailed on Oct. 27, 2011, 5 Pages of Notice of Allowance and 1 Pages of Partial English Translation.

Notice of Allowance received for Japanese Patent Application No. 2012-229860, mailed on Jul. 22, 2014, 3 Pages of Notice of Allowance only.

Office Action from Chinese Patent Application 200980107846.2 mailed Nov. 15, 2014. 3 Pages Chinese Office Action, 4 Pages English Translation.

Notice of Allowance Received for U.S. Appl. No. 12/053,722, mailed on Oct. 10, 2013, 11 Pages.

Office Action Received for U.S. Appl. No. 12/053,722, mailed on Apr. 3, 2012, 29 Pages.

Office Action Received for U.S. Appl. No. 12/053,722, mailed on Apr. 22, 2013, 26 Pages.

Office Action Received for U.S. Appl. No. 12/053,722, mailed on Jan. 19, 2011, 26 Pages.

Office Action Received for U.S. Appl. No. 12/053,722, mailed on Jun. 21, 2011, 23 Pages.

Office Action Received for U.S. Appl. No. 12/053,722, mailed on Nov. 3, 2011, 24 pages.

Office Action Received for U.S. Appl. No. 12/053,722, mailed on Oct. 4, 2012, 28 Pages.

Office Action Received for Korean Patent Application No. 2010-7020350, mailed on Aug. 19, 2011, 2 Pages of Office Action only English Translation.

Office Action received for Chinese Patent Application No. 200980107846.2, mailed on Sep. 25, 2012, 7 Pages of Office Action and 4 pages of English Translation.

Office Action received for European Patent Application No. 09720301.2; mailed on Oct. 22, 2010, 2 pages.

Office Action received for Japanese Patent Application No. 2010-547874, mailed on May 29, 2012, 2 Pages of Office Action and 2 Pages of English Translation.

Office Action received for Japanese Patent Application No. 2010-547874, mailed on Dec. 6, 2011, 3 Pages of Office Action and 3 Pages of English Translation.

Office Action received for Japan Patent Application No. 2012-229860 mailed on Dec. 3, 2013, 2 Pages of Office Action and 2 Pages of English Translation.

International Preliminary Report on Patentability and Written Opinion received for PCT Patent Application No. PCT/US2009/036576, mailed on Sep. 14, 2010, 6 pages.

International Search Report and Written Opinion received for PCT Patent Application No. PCT/US2009/036576, mailed on Aug. 21, 2009, 12 pages.

* cited by examiner

MULTI-RECEIVER FRAME AGGREGATION

REFERENCE TO RELATED INVENTIONS

This is a Continuation application corresponding to U.S. Non-Provisional patent application Ser. No. 12/053,722, filed Mar. 28, 2008 and now U.S. Pat. No. 8,660,144 and is hereby incorporated by reference in its entirety.

BACKGROUND

With the recent dramatic increase in the physical data rate of wireless technologies, frame aggregation schemes have been developed to increase the efficiency of the protocols using those technologies by combining multiple packets into the same frame, thus saving on overhead requirements. A number of single-receiver aggregation (SRA, where all the aggregated packets are addressed to the same device) have been developed. Some of these may be labeled as A-MSDU, A-MPDU, A-PPDU, and PPDU bursting, depending on whether the aggregation takes place with service data units or protocol data units, and whether at the MAC layer or the PHY layer. However, these techniques may not work as well for multi-receiver aggregation (MRA, where some of the aggregated packets are addressed to different devices). If each device has to receive and decode the entire frame to determine if the frame has packet(s) addressed to that device, a great deal of processing power and electrical energy may be consumed unnecessarily. This is especially critical in battery powered mobile devices, where conserving electrical energy is very important. In addition, if part of the frame is received in a corrupted state due to interference or weak signals, all the rest of that frame may need to be retransmitted, again using electrical energy unnecessarily.

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
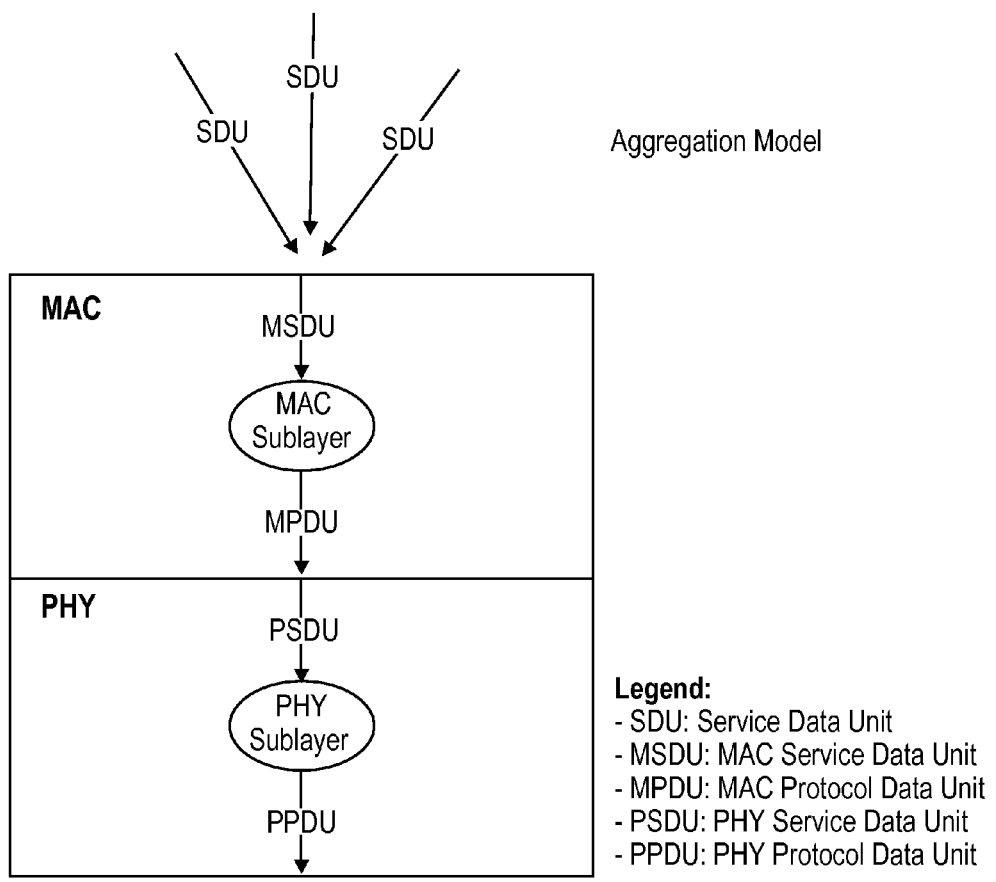
FIG. 1 shows an aggregation model, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" is used to indicate that two or more elements are in direct physical or electrical contact with each other. "Coupled" is used to indicate that two or more elements co-operate or interact with each other, but they may or may not be in direct physical or electrical contact.

As used in the claims, unless otherwise specified the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a tangible storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

The term "wireless" and its derivatives may be used to describe circuits, devices, systems, methods, techniques, communications channels, etc., that communicate data by using modulated electromagnetic radiation through a non-solid medium. The term does not imply that the associated devices do not contain any wires, although in some embodiments they might not. The term "mobile" wireless device is used to describe a wireless device that may be in motion while it is communicating.

Various embodiments of the invention may add a sub-header to the format of a standard frame, so that the sub-header defines which of the subsequent packets are addressed to which devices. The sub-header may also specify other details of each packet, so that different modulation/coding rates, different lengths, different types of acknowledgements, etc., may be used for the different packets that are aggregated together in a single frame. Note: the term 'packets' is used broadly here. The following description is written in terms of MPDU's (MAC protocol data units) that are aggregated into a PSDU (PHY service data unit), but these terms are not intended to limit the scope of the embodiments of the invention to implementations using these terms or aggregating at this particular level.

FIG. 1 shows an aggregation model, according to an embodiment of the invention. Multiple service data units (SDUs) may need to be transmitted to one or more devices in a wireless network. In some embodiments, an SDU may be equated to a packet in older protocols, although other embodiments may differ in this respect. When the SDUs are presented to the MAC layer, they are relabeled in the drawing as MSDUs. At the MAC layer, some of these SDUs may be combined (aggregated) into a single MPDU, which can be treated as a single data unit for transmission. As the MPDUs are presented to the PHY layer, one or more MPDUs may be combined into a single PSDU. Within the PHY layer, one or more PSDUs may be combined into a PPDU for transmission. At the receiver, this order may be reversed, with these various combinations of data units being disassembled back into the original SDUs.

Figure 2:
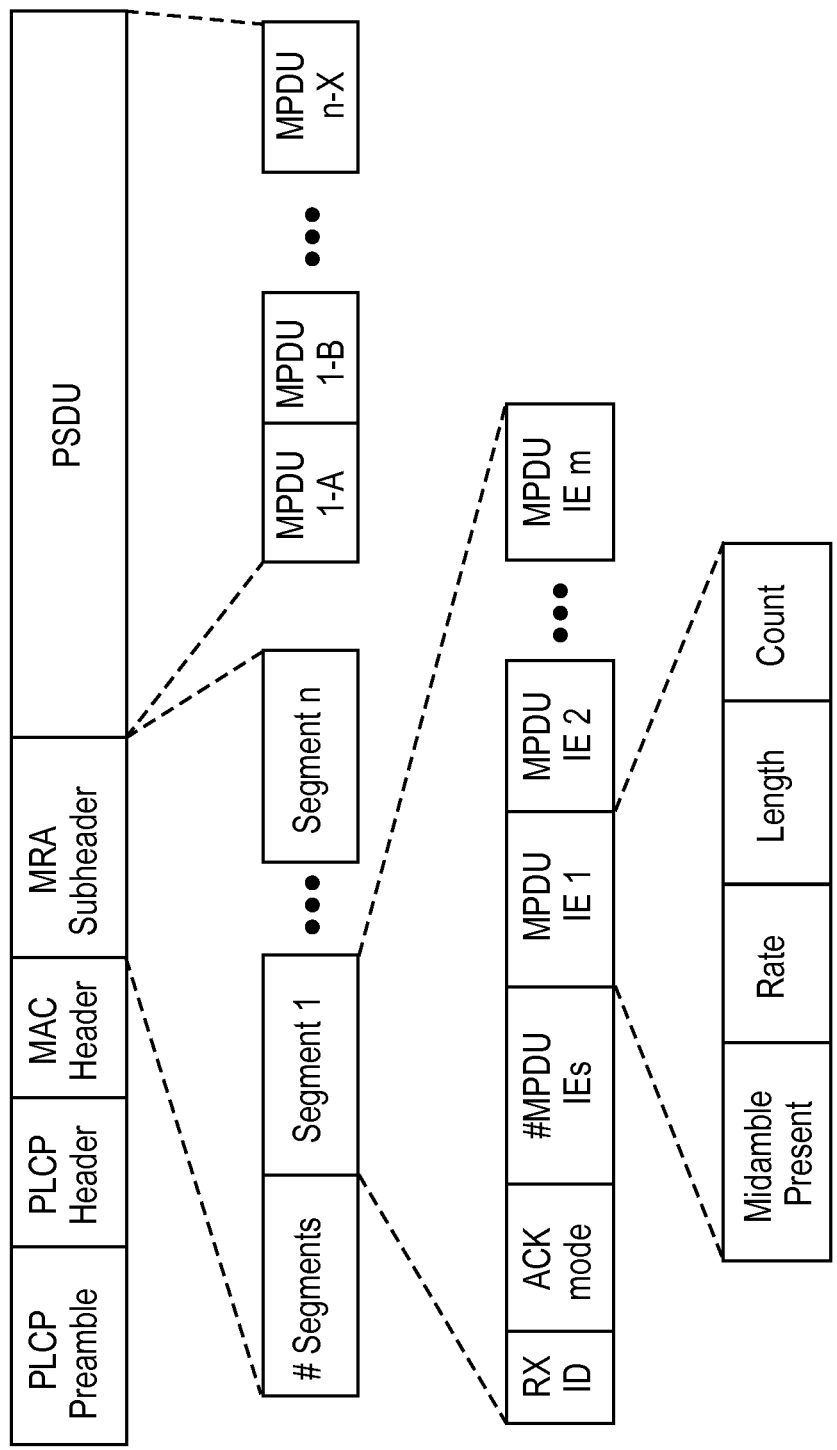
FIG. 2 shows an aggregation protocol, according to an embodiment of the invention.

FIG. 2 shows an aggregation protocol, according to an embodiment of the invention. This protocol might be used, for example, by a base station in controlling communications with a number of mobile stations, although various embodiments of the invention may not be limited to a network using devices labeled with these terms. Although the examples shown in FIG. 2 describe aggregation of MPDUs into a PSDU, the techniques discussed in this disclosure may be applied to aggregation at any of the levels shown in FIG. 1. At the top of FIG. 2, a frame or portion of a frame contains a PSDU, which in turn contains multiple MPDUs. At this level, the PSDU may be considered the payload containing the data being transmitted, with the preceding preamble/header portions specifying how to receive and interpret that payload data. The PSDU is preceded by a PLCP preamble, to allow receiving devices to correctly synchronize on the signal, a PLCP header containing information about how the PSDU is organized at the PHY level, and a MAC header containing information about how the PSDU is formatted at the MAC level. Unlike conventional protocols, however, a multi-receiver aggregation (MRA) sub-header is also included, which describes how the MPDUs in the PSDU are formatted in a manner that is in compliance with the embodiments of this invention. In some operations, every PSDU will have an MRA sub-header, while in other operations only some of the PSDUs will have an MRA sub-header, and an indicator will be included in the communications to define whether such a sub-header is included.

The MPDUs in the PSDU may be organized by the address of the intended receiving device, and also by other characteristics. For example, MPDUs 1-A, 1-B . . . , represent a group of MPDUs that are transmitted consecutively and that are addressed to the same device, which we can label as device 1 for this illustration. Information segment 1 in the MRA sub-header contains information that may be applied to all the MPDUs in this group. Information segment 2 may contain information to be applied to a second group of one or more MPDUs that follow group 1 in the PSDU, and that are transmitted consecutively in the PSDU. At the end of the sub-header, information segments n contain information to be applied to the final group of MPDUs, group n. The term MPDU n-x is used to indicate the last in a quantity of x MPDUs in this final group n. Looking at the beginning of the MRA sub-header, the field # Segments contains an indication of the quantity of such information segments (i.e., the value of n) that are included in the MRA sub-header. Thus, a quantity of MPDUs in the PSDU may be grouped into n groups, each group having one or more MPDUs addressed to the same device, and the MRA sub-header may contain a field defining the number of such groups, as well as a segment of information about each of those groups. In some embodiments, the value of n and/or the total number of MPDUs may each be any feasible quantity, while other embodiments may limit either or both of these parameters. In some embodiments, each group may have any feasible number of MPDUs, while other embodiments may limit or standardize this quantity.

Figure 7:
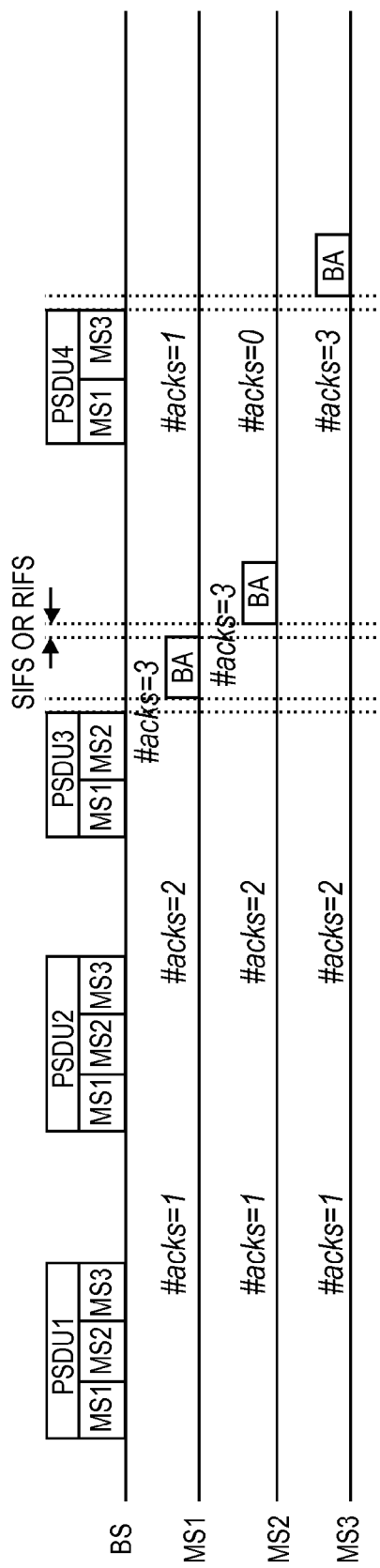
FIG. 7 shows a diagram of how ACKs may be controlled to improve overall efficiency when using the aggregated protocols, according to an embodiment of the invention.

Each of information segments 1 through n may be further sub-divided into a number of fields. For example, an RX ID field may be at the beginning of each information segment to define the address of the destination device the MPDUs in that group are addressed to. Another field labeled ACK Mode is shown, defining which type of acknowledgement is expected from the receiving device when it receives the MSDUs in that group. Some examples are an immediate ACK (to be transmitted after the current PSDU but before the next PSDU), a delayed ACK (the ACK is withheld until multiple PSDUs have been received), a block ACK (acknowledging receipt of multiple PSDUs with a single response), etc. These are examples, but other types of ACKs may be used. FIG. 7 shows examples of how some of these ACKs may be used within the context of the protocols of FIG. 2. In some embodiments, if only one type of ACK is always used, the ACK Mode field may be eliminated.

Following the ACK mode field is the # MPDU Information Element (IE) field, which indicates how many MPDU IE fields are contained in this information segment. This quantity may or may not correspond to the number of MPDUs that are in this group, because each MPDU IE field may be applied to one or more MPDUs. However, all the MPDUs covered by a single MPDU IE field must all have the same characteristics defined by that MPDU IE field. In the example shown, group 1 can contain no less than m MPDUs, because information segment 1 contains m MPDU IE fields, with each of these MPDU IE fields describing the characteristics of one or more associated MPDUs.

In FIG. 2, the field MPDU IE 1 is further broken out to show its contents. In the example shown, the Midamble Present field indicates whether the associated MPDU(s) are preceded by an internal preamble so that the intended receiving device can re-synchronize on the signal. The term 'midamble' is used here to indicate that this preamble is internal to the PSDU, but the embodiments of the invention are not limited to devices that are labeled with this term. Following the Midamble Present field is a Rate field to indicate the modulation/coding rate used in these MPDU(s). Thus the MPDUs defined by this MPDU IE field may, if desired, use a different modulation/coding rate than the preceding MPDUs.

The Length field may be used to define the length of each MPDU associated with this MPDU IE field. This length may be expressed in any feasible units, such as time, bits, symbols, etc. Following the Length field is a Count field, to specify how many consecutive MPDUs this MPDU IE field is to be applied to. This field permits a variable number of MPDUs to be covered by each MPDU IE field. In embodiments in which a predefined number of MPDUs are covered by each MPDU IE field in the segment, the Count field may be eliminated.

Placing an MRA Sub-header prior to the PSDU can have a number of advantages. For example, a potential receiving device has to look no further than the MRA sub-header to determine if the PSDU contains any MPDUs addressed to it. If the PSDU does not, the device may be able to enter a low power mode for the duration of the PSDU. Similarly, the device may be able to determine from the MRA Sub-header where the MPDUs addressed to it are located in the PSDU, and may enter a low power mode subsequent to reading the last of those MPDUs. Also, since the MRA Sub-header immediately follows the MAC header (in some embodiments it may be included as an extension to the MAC header rather than a separate header entity), it may be transmitted at the robust modulation/coding rate that is used for the MAC header (which may generally be a slower modulation/coding rate than used for the payload), making it less likely that the MRA Sub-header will be received in a corrupted state. Another advantage is that a receiving device that receives a partially corrupted PSDU may be able to determine from the sub-header if the corrupted part of the payload was addressed to it. If not, there may be no need to request a retransmission of the corrupted part.

The transmit power used by the transmitter to send MPDUs addressed to different receivers may not be the same, since the channel quality among different receivers will vary. Hence, in between transmissions of MSDUs addressed to different receivers, the transmitter is allowed to insert an interframe space (IFS). The IFS may allow the transmitter to adjust its own power amplifier to the required transmit power for each receiver.

Figure 3:
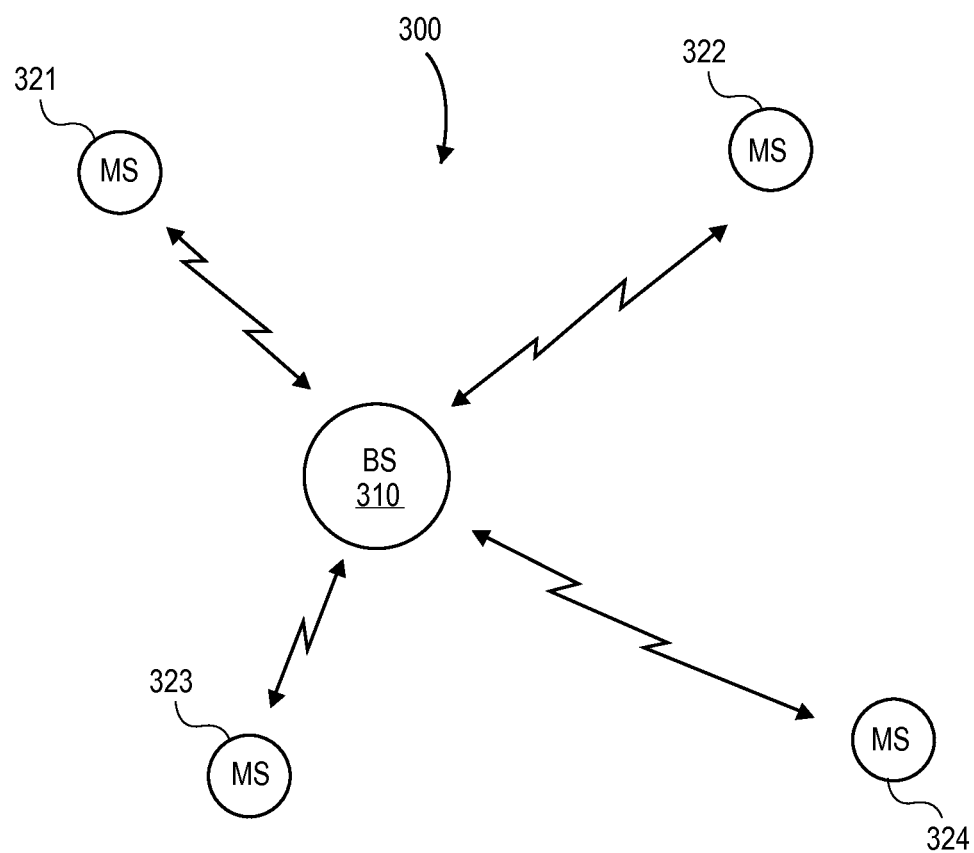
FIG. 3 shows a wireless communications network, according to an embodiment of the invention.

FIG. 3 shows a wireless communications network, according to an embodiment of the invention. In the illustrated network 300, a base station (BS) 310 may communicate with various mobile stations (MS), such as 321, 322, 323, 324. The base station may transmit a frame to multiple ones of these mobile stations, using the protocol exemplified in FIG. 2. Note: for simplicity of illustration, only four mobile stations are shown, but a typical network scenario might contain many more mobile stations than shown. The network may use any feasible type of wireless communications, such as but not limited to: 1) code division multiple access (CDMA), 2) time division multiple access (TDMA), 3) orthogonal frequency division multiple access (OFDMA), 4) etc. In some embodiments, the network communications may conform to the requirements of a particular communications standard, such as but not limited to the standards defined by the Institute of Electrical and Electronic Engineers (IEEE) 802.11, IEEE 802.15, etc., in the most recent published versions available in February 2008.

Figure 4:
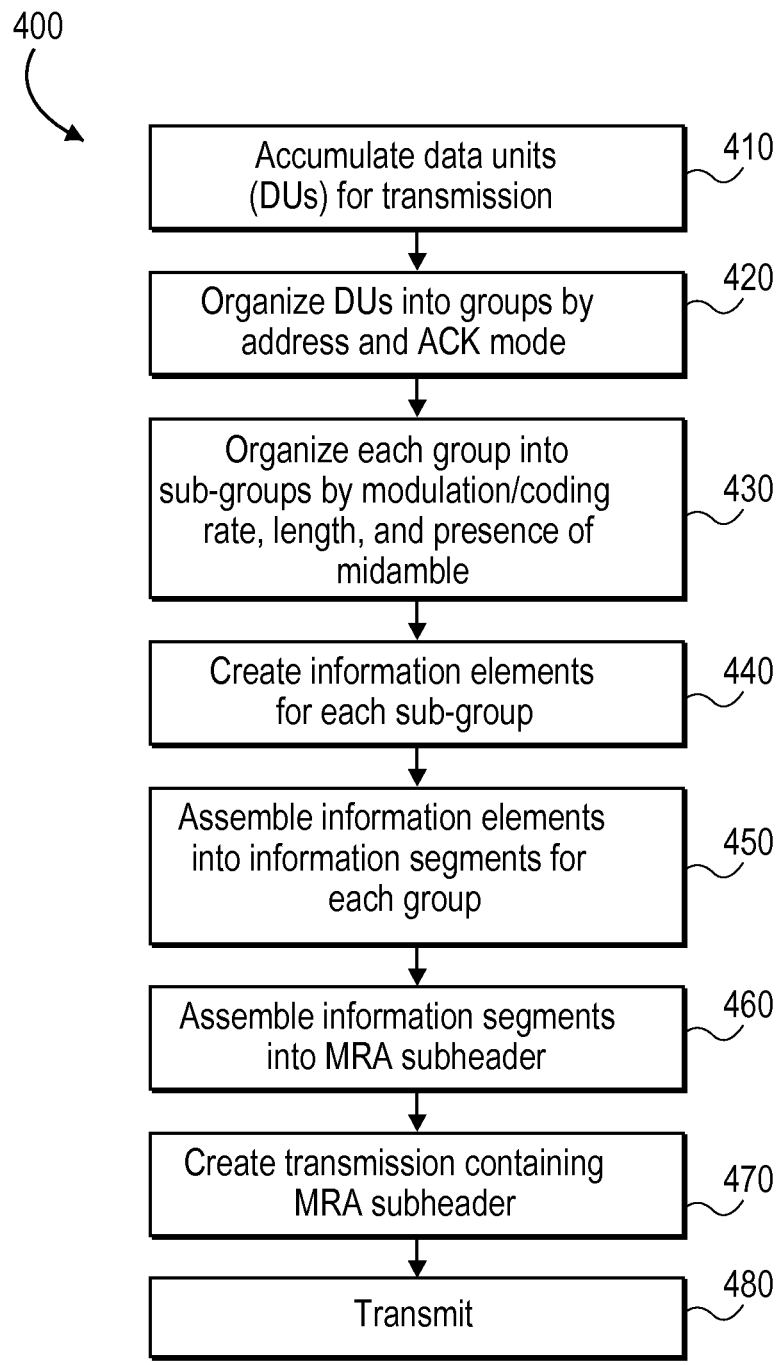
FIG. 4 shows a flow diagram of a method of assembling a transmission using multi-receiver aggregation, according to an embodiment of the invention.

FIG. 4 shows a flow diagram of a method of assembling a transmission using multi-receiver aggregation, according to an embodiment of the invention. This process may be performed by a base station, for example, in creating a transmission directed to multiple mobile stations in a wireless communications network. Although this example shows various operations taking place in a particular order, other embodiments may perform the operations in a different order, and may even perform some operations in parallel.

In the illustrated flow diagram 400, at 410 the base station may accumulate multiple data units that are to be transmitted to various mobile stations in the network. These may be any feasible type of data units, such as but not limited to MSDUs, MPDUs, PSDUs, PPDUs, etc. At 420 the data units may be organized into groups, with the data units in each group having the same destination address, and in some embodiments also having the same type of acknowledgement expected from the destination device. At 430, each group may be further organized into sub-groups having other parameters in common, such as but not limited to modulation/coding rate, length, and/or the presence of a midamble before each data unit. These groups and sub-groups may then be arranged in the order they are to be transmitted, as that order is defined by these groupings.

At 440, information elements (IEs) for each sub-group may be created, defining the parameters that the data units in each sub-group have in common. The IEs for groups having other parameters in common, such as destination address, may then be assembled at 450 into information segments, with each segment associated with a particular group of data units. These information segments may then be assembled into an MRA sub-header at 460. At 470, the MRA sub-header may be combined with other transmission fields, such as but not limited to a PLCP preamble, PLCP header, and MAC header, and collectively placed in front of the organized data units in a transmission buffer. Finally, the contents of the transmission buffer may be transmitted at 480, in the order previously defined.

Figure 5:
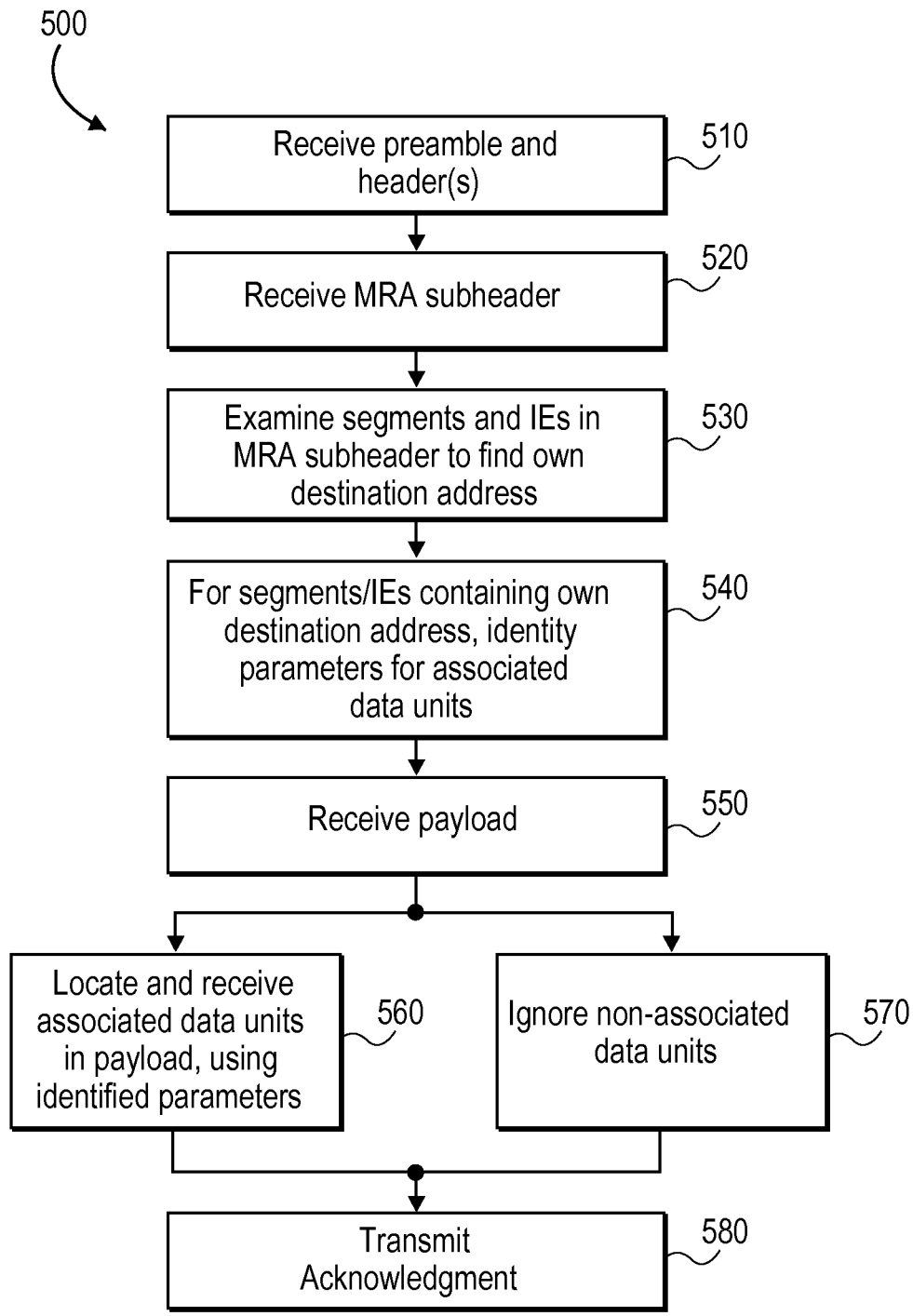
FIG. 5 shows a flow diagram of a method of receiving a multi-receiver aggregation transmission, according to an embodiment of the invention.

FIG. 5 shows a flow diagram of a method of receiving a multi-receiver aggregation transmission, according to an embodiment of the invention. This procedure may be performed by a mobile station, for example, to receive a transmission that was created using the process of FIG. 4. Although this example shows various operations taking place in a particular order, other embodiments may perform the operations in a different order, and may even perform some operations in parallel.

In the illustrated flow diagram 500, at 510 the mobile station may receive the preamble and one or more headers of a transmission from the base station. In some embodiments, the preamble/headers may signify the beginning of a frame, while in other embodiments they may be found in the interior of a frame. At 520 the mobile station may receive the MRA sub-header, as it is previously described in this document. The MRA sub-header may then be examined at 530 to locate portions of it (e.g., segments/IEs) that contain the destination address of the mobile station. For those portions containing its address, at 540 the mobile station may identify the parameters that apply to the associated data units, and identify where those data units will be located in the upcoming payload.

As the payload is received at 550, the relevant portions of the payload may be located and received at 560, using the associated parameters (e.g., modulation/coding rate, length, etc.) that were defined in the sub-header. Those portions of the payload that were not identified as being addressed to this device may be ignored at 570. In some embodiments, ignoring those portions may include going into a low power mode until the mobile device needs to receive another portion of the transmission. After the transmission has been received, the mobile device may transmit an ACK at 580 to indicate successful reception. If the associated segment specified the type of ACK expected, the mobile device can transmit that type of ACK. Alternatively, if the transmission was not received successfully, the mobile station may transmit a NAK. If configured for it, the mobile station may transmit a combination of ACKs and NAKs for different parts of the transmission.

Figure 6:
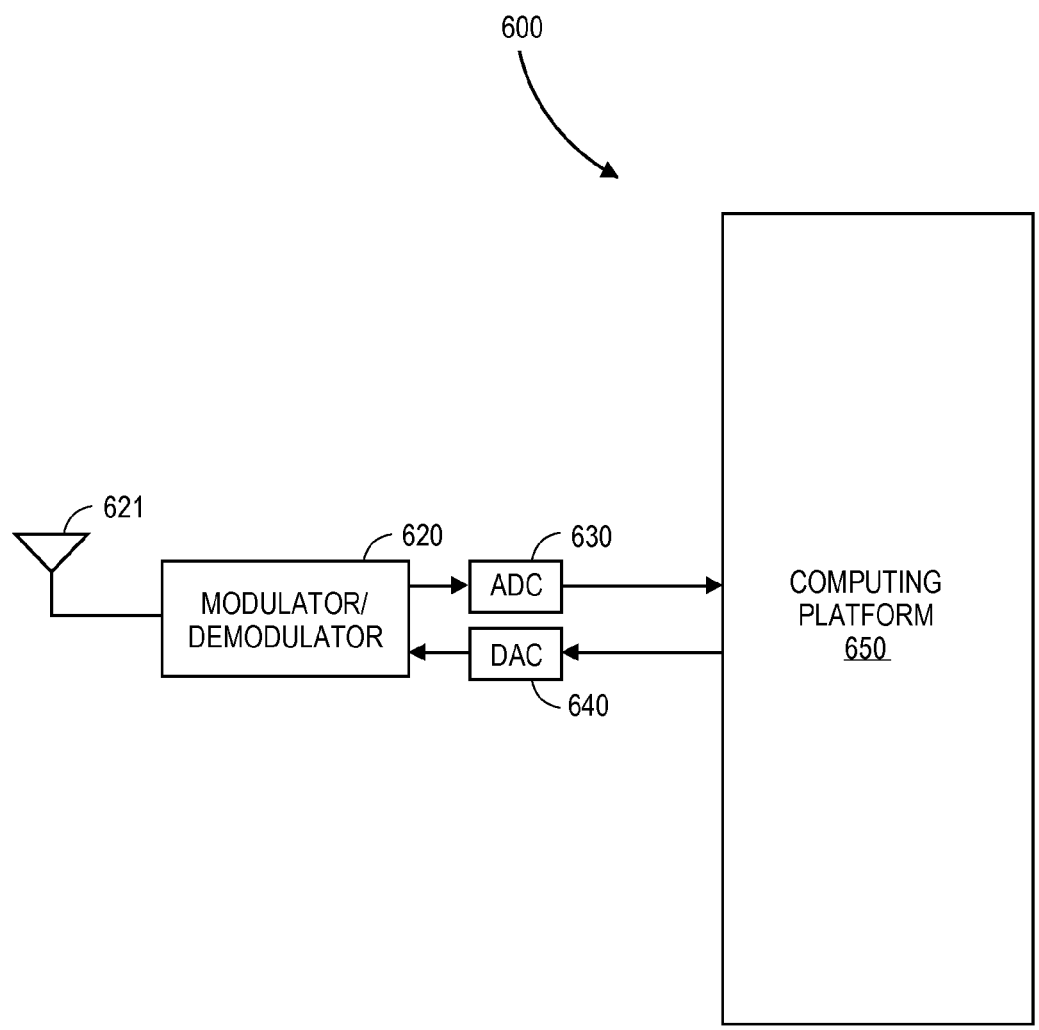
FIG. 6 shows a diagram of a wireless communications device, according to an embodiment of the invention.

FIG. 6 shows a diagram of a wireless communications device, according to an embodiment of the invention. Device 600 may represent either a base station or a mobile device. Computing platform 650 contains one or more processors to perform most of the operations of examining, organizing, analyzing, etc. that were previously described. Digital-to-analog converter (DAC) 640 may convert the digital data to analog signals for transmission, while analog-to-digital converter (ADC) 630 may convert received analog signals to digital data for processing in the computing platform. Modulator/demodulator 620 converts the received radio frequency (RF) signals to analog, and converts the analog signals to RF signals for transmission. Antenna 621 provides the air interface to transmit and receive RF signals. In some embodiments, multiple such antennas may be used on a single wireless device.

FIG. 7 shows a diagram of how ACKs may be controlled to improve overall efficiency when using the aggregated protocols, according to an embodiment of the invention. As previously shown in FIG. 2, the base station may define the mode of how a receiver acknowledges receipt of the MPDUs, by specifying which one of multiple ACK modes that the mobile station should use when acknowledging correct receipt of the transmission from the base station. Requesting a Block Ack (BA), for example, can reduce overhead in the communications sequence by having a MS withhold its ACK until it receives multiple PSDUs, and then acknowledging all of those PSDUs with a single ACK response. Waiting for too many PSDUs before responding, however, can actually reduce efficiency, because excessive delay may allow more network errors to take place (e.g., errors due to changing channel conditions) before the base station becomes aware of those errors and makes changes to deal with them. The base station, therefore, can dynamically change the requested ACK mode to attempt to improve overall efficiency in the presence of changing channel conditions.

In the example of FIG. 7, a base station (BS) is shown transmitting four PSDUs, each addressed to two or more of mobile stations MS1, MS2, and MS3. Each of these four PSDUs (PSDU1, PSDU2, PSDU3, and PSDU4) should be acknowledged in some manner by each of the mobile stations addressed by that PSDU. In the illustrated example, PSDU1 has MPDUs addressed to MS1, MS2, and MS3, respectively, and PSDU1 sets the ACK mode field for each mobile station to request a delayed ACK. PSDU2 does the same, addressing MPDUs to each of MS1, MS2, and MS3, and requesting a delayed ACK from each one. PSDU3 addresses MPDUs only to MS1 and MS2, and sets the ACK Mode field to request a Block ACK from each of those two devices covering all three PSDUs. Since MS1 and MS2 now have three PSDUs to acknowledge, they each do so with a Block ACK (BA) that has a field for each of the three PSDUs being acknowledged. Note: if the relevant portions of a PSDU were not received correctly by a mobile station, and/or cannot be corrected by the mobile station, the ACK response may contain a field set to indicate 'not acknowledged' (NAK) for that particular PSDU from that particular MS.

Since the BAs transmitted from MS1 and MS2 might interfere with each other if transmitted at the same time, the communication protocols may specify which one transmits first, and the timing of those two transmissions. A short interframe space (SIFS) or a reduced interframe space (RIFS) is shown separating the BAs from each other and from the preceding PSDU, although other techniques may be used to provide sufficient time between transmissions from different devices.

At this point, MS1 and MS2 have acknowledged all the preceding PSDUs addressed to them, but MS3 has not. When the base station transmits PSDU4 to MS1 and MS3, it may request a Block ACK from MS3, and a delayed ACK from MS1. MS3 therefore responds with a block acknowledgment for all three of the previously received PDSUs, while MS1 withholds its acknowledgment until a later PSDU instructs it to send a Block ACK.

Thus it can be seen how the base station may attempt to dynamically maximize network efficiency by controlling Delayed ACKs and Block ACKs from each mobile station, in response to changing channel conditions for each mobile station. Although not shown in FIG. 7, immediate ACKs may also be used in combination with block ACKs and delayed ACKs to further this goal.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. An apparatus comprising:
a wireless communications device comprising:
a modulator; and
a demodulator, wherein the demodulator is to:
receive a wireless communication containing multiple data units and formatted with a multi-receiver aggregation protocol;
read a sub-header in the wireless communication to identify one or more particular segments identifying consecutive data units in the wireless communication that are addressed to the wireless communications device;
read, within the one or more particular segments, information elements each indicating respective information associated with a sub-group of one or more data units of the consecutive data units that have the same characteristics, wherein the respective information comprises a common modulation/coding rate, a common length, and a count of the one or more data units in the sub-group for receipt by the wireless communications device;
receive the identified consecutive data units, using the respective common modulation/coding rates, the respective common lengths, and the respective counts; and
not receive at least a portion of data units not identified by the one or more particular segments.

2. The apparatus of claim 1, wherein the one or more particular segments indicate a type of acknowledgement and a time period associated with the type of acknowledgement expected in response to the wireless communication.

3. The apparatus of claim 1, wherein reading the one or more particular segments further comprises the demodulator to read a particular segment of the one or more particular segments containing an indicator of a number of the information elements in the particular segment.

4. The apparatus of claim 1, wherein reading the one or more particular segments further comprises the demodulator to read a particular information element of the information elements containing an indication of whether the one or more data units are to be preceded by a midamble.

5. The apparatus of claim 1, wherein the one or more particular segments indicate a common address for the wireless communications device.

6. The apparatus of claim 1, wherein the demodulator is further to read a field in the multi-receiver aggregation protocol indicating that the sub-header exists, wherein the sub-header is located adjacent to a first data unit of the multiple data units.

7. A method comprising:
receiving, by a wireless communications device, a wireless communication containing multiple data units and formatted with a multi-receiver aggregation protocol;
reading, by the wireless communications device, a sub-header in the wireless communication to identify one or more particular segments identifying consecutive data units in the wireless communication that are addressed to the wireless communications device;
reading, by the wireless communications device within the one or more particular segments, information elements each indicating respective information associated with a sub-group of one or more data units of the consecutive data units that have the same characteristics, wherein the respective information comprises a common modulation/coding rate, a common length, and a count of the one or more data units in the sub-group for receipt by the wireless communications device;

receiving, by the wireless communications device, the identified consecutive data units, using the respective common modulation/coding rates, the respective common lengths, and the respective counts; and not receiving, by the wireless communications device, at least a portion of data units not identified by the one or more particular segments.

8. The method of claim 7, wherein the one or more particular segments indicate a type of acknowledgement and a time period associated with the type of acknowledgement expected in response to the wireless communication.

9. The method of claim 7, wherein reading the one or more particular segments further comprises reading a particular segment of the one or more particular segments containing an indicator of a number of the information elements in the particular segment.

10. The method of claim 7, wherein reading the one or more particular segments further comprises reading a particular information element of the information elements containing an indication of whether the one or more data units are to be preceded by a midamble.

11. The method of claim 7, wherein the one or more particular segments indicate a common address for the wireless communications device.

12. The method of claim 7, further comprising reading a field in the multi-receiver aggregation protocol indicating that the sub-header exists, wherein the sub-header is located adjacent to a first data unit of the multiple data units.

13. A system comprising:
   at least one radio;
   at least one antenna;
   at least one memory; and
   at least one processor, wherein the at least one processor is to:
      receive a wireless communication containing multiple data units and formatted with a multi-receiver aggregation protocol;
      read a sub-header in the wireless communication to identify one or more particular segments identifying consecutive data units in the wireless communication that are addressed to the system;
      read, within the one or more particular segments, information elements each indicating respective information associated with a sub-group of one or more data units of the consecutive data units that have the same characteristics, wherein the respective information comprises a common modulation/coding rate, a common length, and a count of the one or more data units in the sub-group for receipt by the system;
      receive the identified consecutive data units, using the respective common modulation/coding rates, the respective common lengths, and the respective counts; and
      not receive at least a portion of data units not identified by the one or more particular segments.

14. The system of claim 13, wherein the one or more particular segments indicate a type of acknowledgement and a time period associated with the type of acknowledgement expected in response to the wireless communication.

15. The system of claim 13, wherein reading the one or more particular segments further comprises the at least one processor to read a particular segment of the one or more particular segments containing an indicator of a number of the information elements in the particular segment.

16. The system of claim 13, wherein reading the one or more particular segments further comprises the at least one processor to read a particular information element of the information elements containing an indication of whether the one or more data units are to be preceded by a midamble.

17. The system of claim 13, wherein the one or more particular segments indicate a common address for the system.

18. The system of claim 13, wherein the at least one processor is further to read a field in the multi-receiver aggregation protocol indicating that the sub-header exists, wherein the sub-header is located adjacent to a first data unit of the multiple data units.

* * * * *